United States Patent
Carman

[11] Patent Number: 5,919,376
[45] Date of Patent: Jul. 6, 1999

[54] FILTRATION APPARATUS AND METHOD

[75] Inventor: Lyle Carman, Mason, Ohio

[73] Assignee: CAE Ransohoff Inc., Cincinnati, Ohio

[21] Appl. No.: 08/872,098

[22] Filed: Jun. 10, 1997

[51] Int. Cl.[6] .......................... B01D 65/02; B01D 61/18
[52] U.S. Cl. .................. 210/785; 210/195.1; 210/195.2; 210/332; 210/354; 210/355; 210/407; 210/411; 210/412; 210/416.1; 210/433.1; 210/650; 210/748; 210/791; 210/805
[58] Field of Search ..................... 210/650, 651, 210/748, 785, 791, 805, 195.1, 195.2, 758, 319, 321.63, 332, 354, 355, 407, 411, 412, 413, 414, 416.1, 433.1

[56] References Cited

U.S. PATENT DOCUMENTS

| 3,782,547 | 1/1974 | Dietert | 209/268 |
| 4,158,629 | 6/1979 | Sawyer | 210/137 |
| 4,253,962 | 3/1981 | Thompson | 210/414 |
| 4,337,158 | 6/1982 | Bodine | 210/785 |
| 4,556,467 | 12/1985 | Kuhn et al. | 204/193 |
| 4,728,368 | 3/1988 | Pedziwiatr | 134/1 |
| 4,911,847 | 3/1990 | Shmidt et al. | 210/650 |
| 4,952,317 | 8/1990 | Culkin | 210/636 |
| 5,053,141 | 10/1991 | Laiho | 210/785 |
| 5,059,331 | 10/1991 | Goyal | 210/785 |
| 5,062,965 | 11/1991 | Bernou et al. | 210/748 |
| 5,074,989 | 12/1991 | Sigaud et al. | 208/161 |
| 5,085,772 | 2/1992 | Busch-Sorensen | 210/388 |
| 5,230,804 | 7/1993 | Leupold et al. | 210/651 |
| 5,262,053 | 11/1993 | Meier | 210/636 |
| 5,298,161 | 3/1994 | Sieg | 210/411 |
| 5,415,781 | 5/1995 | Randhahn et al. | 210/650 |
| 5,445,738 | 8/1995 | Fry et al. | 210/384 |
| 5,490,937 | 2/1996 | van Reis | 210/637 |

Primary Examiner—John Kim
Attorney, Agent, or Firm—Olson & Hierl, Ltd.

[57] ABSTRACT

An improved filtration system comprises a vessel divided into a concentrate chamber and a permeate chamber by a permeable septum. An ultrasonic wave generator is mounted to the vessel and positioned to direct ultrasonic waves through both the permeate contained in the permeate chamber and the permeable septum. A circulator such as a pump or agitator is operably associated with the concentrate chamber to provide a shearing force on the surface of the permeable septum. A vessel inlet port allows concentrate to flow into the concentrate chamber and a permeate outlet port allows permeate to be withdrawn.

13 Claims, 3 Drawing Sheets

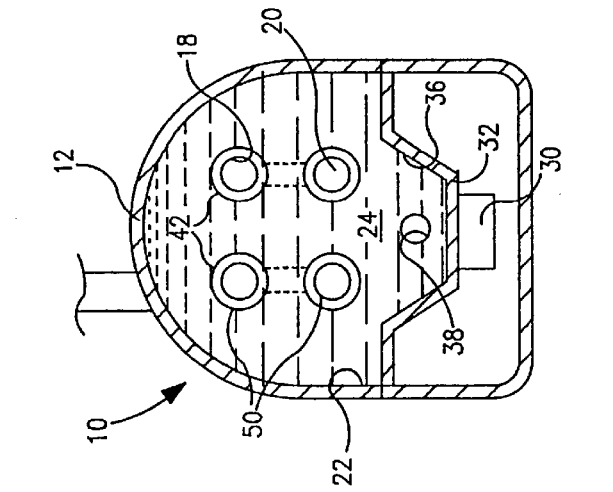
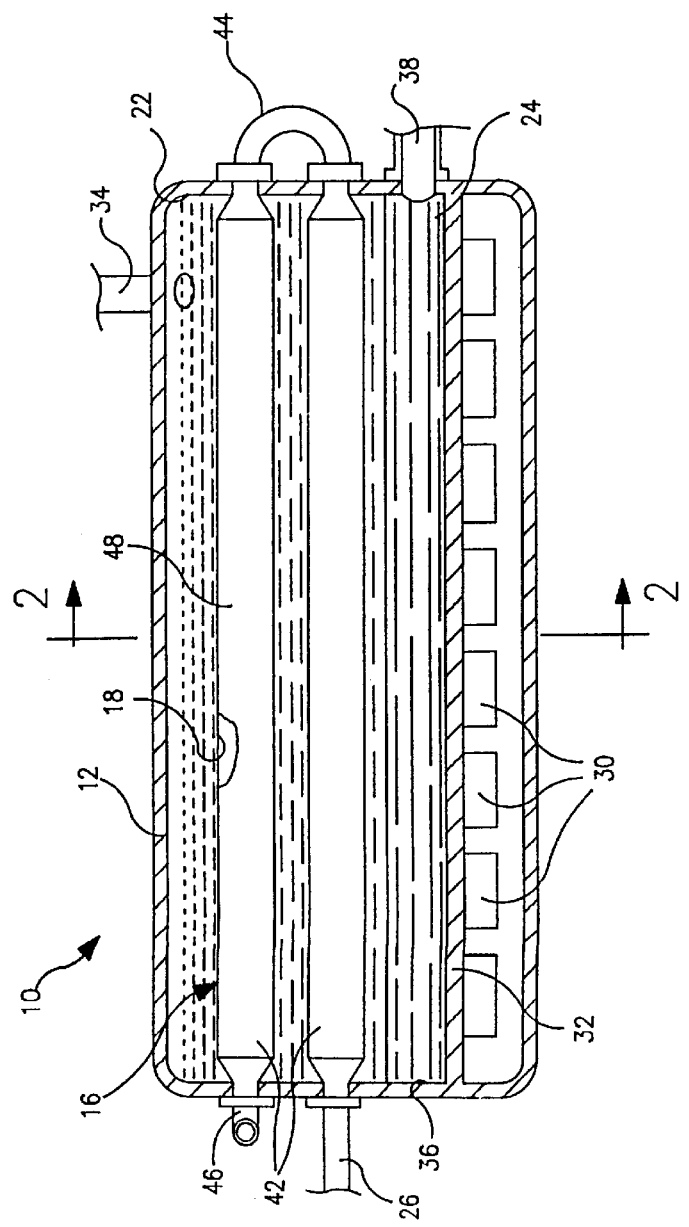
FIG. 2
FIG. 1

FILTRATION APPARATUS AND METHOD

TECHNICAL FIELD OF THE INVENTION

The present invention relates to a filtration method and apparatus. More particularly, it relates to filtration methods employing permeable and semi-permeable membranes as the filtration media.

BACKGROUND OF THE INVENTION

Filtration is a widely used solid-liquid separation process. Depending upon the application, a wide variety of filtration media ranging from simple screens to complex ultrafiltration membranes are available. A well-known and persistent problem with filtration processes is particle (or solute) polarization and the ultimate fouling of the filtration media.

As insoluble particles or solutes are rejected by the filter media, they accumulate at the surface, where insoluble particles form cakes, and at high concentrations, solutes precipitate to form gel layers. Permeate flow resistance due to the cake or gel layer is often much greater than that of the filtration media. As filtration continues, these layers increase in thickness and become compacted, resulting in ever lower transmembrane flow. When resistance reaches a level making filtration impractical, the filter membrane or screen is said to be fouled.

Therefore, filter cleaning inevitably becomes an all too frequent step for filtration processing. Conventional cleaning techniques, which can range from back-flushing and automated scraping to manual scraping and membrane replacement, are time consuming and generally require a shut-down of the filtration process. Where the filtration functions as a step in an otherwise continuous process, two or more filters are typically arranged in parallel to allow periodic cleaning by rotating service. Such process shut downs and extra equipment of course increase the overall cost of filtration processing.

Efforts at overcoming the fouling problem are reflected in various techniques developed for removing the cake or gel layers without interrupting the filtration process. For example, the cross-flow filtration technique has found widespread use. With the cross-flow technique, the filtration membranes are not only penetrated from the unfiltered or concentrate side to the filtrate or permeate side, but on the concentrate side, a strong cross-flow is generated along the membrane surface. This flow of concentrate (or parent fluid) along the membrane surface reduces the overall build-up of the gel layer and therefore, slows membrane fouling.

One alternate configuration for cross-flow filtration involves the use of rotating elements in a stationary vessel. U.S. Pat. No. 4,911,847 to Shmidt et al. illustrates a filtration device employing a membrane mounted on an inner body which rotates within a stationary outer body.

A widely used approach is periodic back-washing without a complete shut-down, i.e., during the filtration, the filtration media is briefly subjected to pressure from the filtrate side, against the direction of permeate flow. Filtration systems employing finer membranes do not respond well to such back-washing, however.

Techniques including vibrational energy have also been developed. U.S. Pat. No. 4,158,629 to Sawyer discloses a filter device having a mechanically resonating housing that transmits wave energy through the flowing concentrate liquid. Unfortunately, this technique requires expensive sound isolation equipment and yields only limited benefits because the ultrasonic energy quickly dissipates in the fast flowing concentrate.

This and other conventional techniques suffer from one or more additional drawbacks as follows: high energy costs, rapid fouling, high equipment cost, frequent membrane damage and maintenance of mechanical elements.

Thus, there continues to be a need for an improved filtration system that can more effectively and efficiently prevent membrane fouling. Specifically, it would be desirable to provide the advantages of back-flush cleaning without interrupting the filtration process. Furthermore, there would be great advantage to a filtration system with ultrasonic energy enhancement suitable for use in a cross-flow configuration.

SUMMARY OF THE INVENTION

The filtration system of the present invention allows efficient, cost-effective filtration at reduced cost. Notably, the system of the present invention minimizes solute polarization in the concentrate, resulting in relatively longer periods of continuous operation and higher permeate transfer rates.

A system aspect of the present invention includes a permeable septum disposed in a vessel (or housing) that divides the vessel into a concentrate chamber and a permeate chamber. An ultrasonic wave generator is mounted to the vessel and positioned to direct ultrasonic waves through a permeate liquid in the permeate chamber and across the permeable septum. A concentrate inlet port in the vessel is provided to allow concentrate to enter the concentrate chamber. A permeate outlet port in the vessel allows permeate to exit the permeate chamber. The present system is well suited for use with ultrafiltration membranes as well as cross-flow filtration modules.

A method aspect of the present invention creates an efficient self-cleaning filtration system suitable for continuous ultra and microfiltration. For example, selected components from a concentrate are separated into a permeate by introducing the concentrate into a concentrate chamber of a housing having a permeable septum disposed therein, pressurizing and circulating the concentrate, and directing ultrasonic waves through the permeate and towards the permeable septum. The concentrate chamber is pressurized to force permeate through the permeable septum, where the permeate is then collected. The ultrasonic waves are generated as the concentrate is circulated to displace solute and reduce the thickness of any gel layer that may form. This dual action facilitates permeate transport across the permeable septum and reduces plugging.

BRIEF DESCRIPTION OF THE DRAWINGS

In the drawings,

FIG. 1 is a side elevation view, partly in section, of a cross-flow filtration system embodying the present invention;

FIG. 2 is a sectional view taken along the plane 2—2 in FIG. 1;

DESCRIPTION OF PREFERRED EMBODIMENTS

Figure 3:
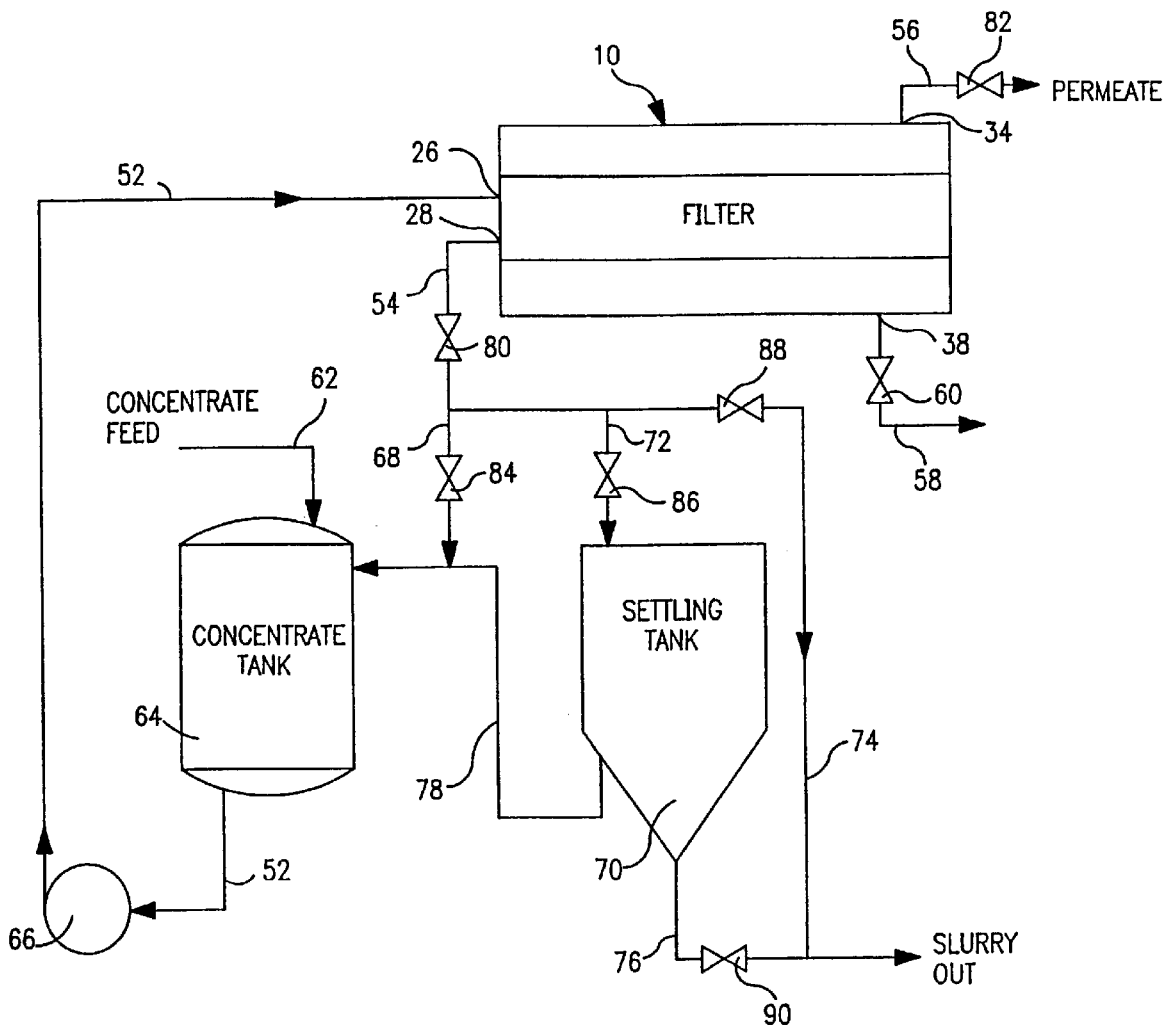
FIG. 3 is a simplified process flow diagram of a filtration process according to the present invention.

While this invention is susceptible to embodiment in many different forms, this specification and the accompanying drawings disclose only preferred forms as examples of the invention. The invention is not intended to be limited to the embodiments so described, however. The scope of the invention is identified in the appended claims.

Embodiments of the contemplated apparatus illustrated in the FIGURES show mechanical elements that are known in the art and that will be recognized by those skilled in the art as such. The detailed descriptions of such elements are not necessary to an understanding of the invention. Accordingly, such elements are herein represented only to the degree necessary to aid in an understanding of the present invention.

Referring now to FIGS. 1 and 2, a filtration system 10 is shown with a vessel (or housing) 12 and a permeable septum in the form of a cross-flow filtration membrane module 16 mounted within vessel 12. Permeable septum partitions vessel 12 into a concentrate chamber 18 containing a concentrate 20 and a permeate chamber 22 containing a permeate 24. Vessel 12 includes a concentrate inlet port 26 and a concentrate outlet port (not shown) for connection to a circulator such as a pump or the like to provide circulation of concentrate 20 through concentrate chamber 18. A series of ultrasonic wave generators in the form of ultrasonic transducers 30 are mounted to a bottom wall 32 of vessel 12.

Ultrasonic transducers 30 are positioned to direct ultrasonic waves through permeate 24 in permeate chamber 22 and through the permeable septum provided by membrane module 16 in a direction from permeate chamber 22 towards concentrate chamber 18. A permeate outlet port 34 at the top of vessel 12 allows permeate 24 to be withdrawn from permeate chamber 22. A trough 36 with a normally blocked drain 38 facilitates cleaning of vessel 12. Vessel 12 can be configured in a shape to better reflect, or focus, and distribute ultrasonic waves towards the permeable septum. As preferred, vessel 12 has a dome shaped upper wall.

Cross-flow filtration membrane module 16 includes parallel tubes 42 and U-shaped conduits 44 and 46 for interconnecting each tube. Parallel tubes 42 include a membrane 48 and a membrane supporting porous core 50.

While the filtration system illustrated in FIGS. 1 and 2 employs a membrane module as the permeable septum, the present invention encompasses filter media ranging from reverse osmosis and ultrafiltration membranes to microfiltration substrates and simple screens. Accordingly, the term "permeable" as used herein includes semipermeable, a label often applied to reverse osmosis and ultrafiltration membranes. The desired separation dictates the required type of filter media, with finer separations requiring finer filtration media.

Various types of ultrasonic transducers are appropriate for use in the present invention, including piezoelectric transducers, magnetostriction transducers, and mass oscillators. A suitable piezoelectric transducer is available from CAE Blackstone of Jamestown, N.Y.

The ultrasonic transducers 30 preferably operate at a frequency in the range from 15 kHz to 100 kHz, and more preferably in the range from 25 kHz to 60 kHz. The ultrasonic transducers 30 must have sufficient sound power levels to induce cavitation in permeate 24.

Cavitation occurs when the compression and rarefaction wave generated by the ultrasonic transducer are intense enough to create points in the liquid system that temporarily have a pressure below the vapor pressure of the liquid. Small vapor bubbles or cavities form and then collapse creating an effective scrubbing force. Therefore, this transducer power requirement necessarily varies according to properties of the permeate such as viscosity and boiling point, and according to the permeate operating conditions such as temperature and pressure. As the boiling point of a liquid or its static operating pressure increase, the power required to cause cavitation increases. In liquid systems maintained near their boiling points, vapor bubbles created by the ultrasonic rarefactions may be self-sustaining in spite of the compression phase and may fail to collapse.

While FIGS. 1 and 2 illustrate a system with an array of transducers mounted to bottom wall 32 of vessel 12, alternate arrangements that cause ultrasonic waves to travel from the permeate side and through the permeate towards the permeable septum are also acceptable. Furthermore, immersible transducers positioned in the permeate chamber are also contemplated.

Although any number of transducers can be utilized, a preferred embodiment of the present invention includes enough transducers to blanket a significant portion of the permeable septum with wave energy. Such an array of transducers, as shown in FIG. 1, can be controlled from a single power supply unit (not shown).

FIG. 3 is a process flow diagram showing filtration system 10 with supporting process equipment. Represented symbolically, filter system 10 includes concentrate inlet port 26 connected to a concentrate input line 52, a concentrate outlet port 28 connected to a concentrate recirculation line 54, and permeate outlet port 34 connected to permeate collection line 56. Drain 38 is also represented by a connection to drain line 58 with drain valve 60.

Concentrate enters the filtration process via concentrate feed line 62 and collects in concentrate tank 64. Concentrate tank 64 is connected to filter system 10 through concentrate input line 52. A pump 66 in concentrate input line 52 serves as the concentrate circulator. Concentrate exits filter system 10 through concentrate recirculation line 54, where it can be directly recirculated to concentrate tank 64 via bypass line 68, passed through optional settling tank 70 via settling tank inlet line 72, or purged to a concentrate purge line 74.

Settling tank 70 provides an additional stage to the filtration process that increases separation efficiency. Separated solids are purged from the filtration system 10 via slurry output line 76, while diluted concentrate is returned to concentrate tank 64 through a return line 78.

The desired pressure profile across concentrate chamber 18 is set by cross-flow valve 80. Noting that drain valve 60 is normally closed, permeate pressure can then be controlled via permeate collection valve 82. Together, concentrate valves 84, 86, and 88 control the relative amount of concentrate that is directly recirculated, sent to settling tank 70, or purged from the process. A slurry valve 90 controls the level of solids in settling tank 70.

In operation, concentrate 20 is introduced into concentrate chamber 18 and pressurized by pump 66 or other circulator. A pressure difference is maintained between concentrate chamber 18 and permeate chamber 22 to force permeate across membrane 48.

From concentrate inlet port 26, concentrate 20 flows axially through each parallel tube 42 of cross-flow filter module 16, before exiting at concentrate outlet port 28. Preferably, the flow of concentrate 20 over the surface of membrane 48 is maintained to generate a shearing on the surface of the membrane sufficient to remove vapor bubbles at its surface.

Permeate chamber 22 is preferably maintained "liquid full" and pressurized relative to ambient atmosphere to provide an ideal transport medium for ultrasonic waves. A "liquid full" condition is preferred to allow maximum distribution of ultrasonic waves and therefore, greater wave contact with cross-flow filter module 16. When pressurized, permeate chamber 22 allows better control of the level and intensity of cavitation in the permeate.

The desired pressure profile at points throughout filtration system 10 is maintained by adjusting cross-flow valve 80, which throttles concentrate output flow, and permeate collection valve 82, which throttles permeate output flow.

Various types of automatic control loops may be used to aid processing and improve efficiency. For instance, cross-flow valve 80 may be reset by a concentrate chamber pressure controller, while permeate collection valve 82 is reset by a transmembrane differential pressure controller. The level of permeate flow could be used to actuate the intensity of ultrasonic waves directed at the filter membrane, or automatically increase the transmembrane pressure difference.

A test unit was constructed using a 0.1 micron stainless steel membrane substantially as shown in FIG. 3. Before start-up, the concentrate tank was charged with tap water heated to approximately 140° F. and the permeate chamber was prefilled with unheated water. Operating with the ultrasonic transducer turned off, the test unit yielded 2 gallons per hour (gph) permeate.

To assess fouling resistance, common fouling agents were added to the concentrate. In less than one minute, permeate flow quickly declined to an undetectable level. Without first interrupting the concentrate cross-flow or adjusting the process valves, the ultrasonic transducers (frequency about 25 MHz) were activated. Within about 2 minutes of transducer activation, permeate flow rose to 1.5 gph.

Next, concentrate flow was stopped for approximately 30 seconds while the transducers remained active. When concentrate flow resumed, permeate flow increased to 2.5 gph.

To confirm the beneficial effects, the transducers were again turned off. Again, permeate flow stopped after a relatively short time period. The transducers were then reactivated, and permeate flow returned to 2.5 gph.

Figure 4:
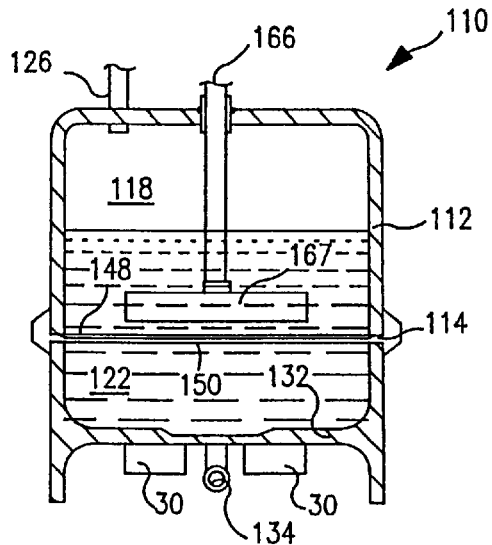
FIG. 4 is a side sectional view of a Nutsche filtration apparatus embodying the present invention.

The filtration system and associated process illustrated in FIGS. 1 through 3 represents one of many possible configurations captured by the present invention. FIG. 4 represents one such alternate configuration. Here, the present invention is adapted to a Nutsche-type filter. Filtration system 110 includes a vessel 112 with a permeable septum provided by filtration membrane module 114 dividing vessel 112 into a concentrate chamber 118 and a permeate chamber 122. Filtration membrane module 114 includes a support screen 150 and membrane 148.

A concentrate inlet port 126 in vessel 112 allows concentrate to enter concentrate chamber 118, while a permeate outlet port 134 allows permeate to exit permeate chamber 122.

Ultrasonic transducers 30 are mounted to a bottom wall 132 of vessel 112 and positioned to direct ultrasonic energy waves through the permeate in permeate chamber 118 and across membrane 148.

An agitator 166 with paddle 167 serves as the concentrate circulator. Paddle 167 represents one of many possible impellers. For example, paddle 167 could be replaced by a propeller, a disc turbine, an anchor impeller, or a helical ribbon, among others, provided the necessary shearing can be imposed on permeable septum 114.

With no concentrate outlet, operation of filter system 112 is necessarily batchwise but nonetheless enhanced by the combination of ultrasonic waves directed from the permeate side and constant concentrate circulation across the surface of membrane 148.

Figure 5:
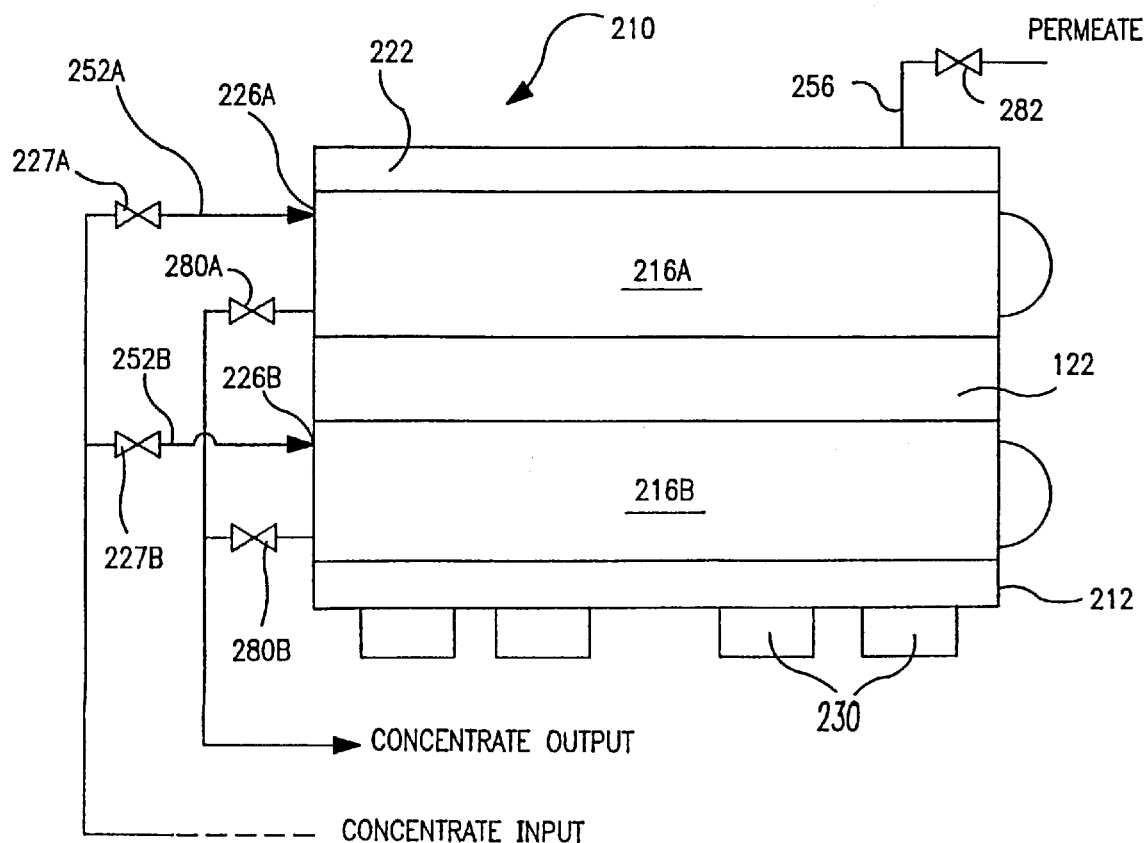
FIG. 5 is a schematic view of a multi-module cross-flow filtration system embodying the present invention.

FIG. 5 illustrates schematically multiple, parallel cross-flow filtration modules that embody the present invention. Filtration system 210 includes vessel 212 containing cross-flow filtration modules 216A and 216B arranged in parallel. Ultrasonic transducers 230 are positioned to direct ultrasonic waves through permeate in permeate chamber 222. Permeate line 256 with permeate valve 282 are provided for permeate collection.

Modules 216A and 216B are served by corresponding inlet ports 226A and 226B, input lines 252A and 252B, input valves 227A and 227B, and outlet valves 280A and 280B.

This parallel arrangement allows concentrate flow to one module to be suspended without interrupting flow to the other module. The membrane of the idled module may then receive ultrasonic waves undissipated by concentrate cross-flow, resulting in effective membrane cleaning. While filtration system 210 as shown in FIG. 5 includes two membrane modules in vessel 212, a full array of modules is contemplated.

The filtration systems of the present invention have several key features. One key feature of the present invention is the ability to limit the accumulation of solute at the surface of a permeable septum. Because of this, the present invention provides longer uninterrupted filtration than heretofore available systems. Specifically, the present invention allows substantially continuous filtering operations without rotating equipment. A second key feature, conventional filtration equipment can be readily retrofitted according to the present invention.

Numerous variations and modifications of the embodiments described above may be effected without departing from the spirit and scope of the novel features of the invention. It is to be understood that no limitations with respect to the specific system illustrated herein are intended or should be inferred. It is, of course, intended to cover by the appended claims all such modifications as fall within the scope of the claims.

I claim:

1. A filtration system comprising:

a vessel;

a permeable septum in said vessel partitioning said vessel into a concentrate chamber and a permeate chamber;

a circulator operably associated with the concentrate chamber;

a concentrate inlet port in said vessel and in communication with said concentrate chamber;

a concentrate outlet port in communication with said concentrate chamber;

a permeate outlet port in said vessel and in communication with said permeate chamber; and an ultrasonic wave generator mounted to said vessel and positioned to direct ultrasonic waves through permeate contained in said permeate chamber and through said permeable septum in a direction from the permeate chamber towards the concentrate chamber;

wherein said circulator is a pump in fluid flow communication with said concentrate outlet port and said inlet port.

2. The filtration system of claim 1 wherein said ultrasonic wave generator is a magnetostriction transducer.

3. The filtration system of claim 1 wherein said ultrasonic wave generator is a piezoelectric transducer.

4. The filtration system of claim 1 wherein said permeable septum is an ultrafiltration membrane.

5. The filtration system of claim 1 wherein said permeable septum is a cross-flow filter module.

6. The filtration system of claim 1 wherein said permeable septum is an array of cross-flow filtration modules.

7. The filtration system of claim 6 wherein said array of cross-flow filtration modules is two cross-flow filtration modules.

8. A filtration process for separating selected components from a concentrate into a permeate that comprises:

introducing the concentrate into a concentrate chamber of a housing having a permeable septum disposed therein;

pressurizing the concentrate chamber to force the permeate to pass through said permeable septum;

circulating the concentrate in said concentrate chamber to induce a shearing on said permeable septum;

generating an ultrasonic wave through the permeate and towards said permeable septum; and collecting the permeate passing through said permeable septum as the ultrasonic wave is generated;

wherein the concentrate is circulated across said permeable septum by pumping concentrate from an outlet port in said housing to an inlet port in said housing.

9. The filtration process of claim 8 wherein said ultrasonic wave is generated at a frequency in the range from about 15 kHz to about 100 kHz.

10. The filtration process of claim 8 wherein said ultrasonic wave is generated to induce cavitation in the permeate.

11. The filtration process of claim 8 wherein said shearing has a magnitude sufficient to remove vapor bubbles at the permeable septum.

12. The filtration process of claim 8 further comprising removing concentrate from the concentrate chamber.

13. A filtration system comprising:

a vessel;

a permeable septum in said vessel partitioning said vessel into a concentrate chamber and a permeate chamber;

a rotary agitator operably associated with the concentrate chamber;

a concentrate inlet port in said vessel and in communication with said concentrate chamber;

a permeate outlet port in said vessel and in communication with said permeate chamber; and an ultrasonic wave generator mounted to said vessel and positioned to direct ultrasonic waves through permeate contained in said permeate chamber and through said permeable septum in a direction from the permeate chamber towards the concentrate chamber.

* * * * *